US011113206B2

(12) United States Patent
Vanninen et al.

(10) Patent No.: US 11,113,206 B2
(45) Date of Patent: Sep. 7, 2021

(54) CACHE DATA LOCATION SYSTEM

(71) Applicant: Hewlett Packard Enterprise Development LP, Houston, TX (US)

(72) Inventors: Matti A. Vanninen, Cary, NC (US); Sudhanshu Goswami, Cary, NC (US); Christopher J. Corsi, Wake Forest, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 106 days.

(21) Appl. No.: 16/396,555

(22) Filed: Apr. 26, 2019

(65) Prior Publication Data
US 2020/0341909 A1 Oct. 29, 2020

(51) Int. Cl.
*G06F 12/10* (2016.01)
*G06F 12/1018* (2016.01)

(52) U.S. Cl.
CPC .... *G06F 12/1018* (2013.01); *G06F 2212/608* (2013.01); *G06F 2212/657* (2013.01)

(58) Field of Classification Search
CPC ............ G06F 12/0864; G06F 12/0897; G06F 12/1018; G06F 12/0871; G06F 12/123; G06F 2212/608; G06F 2212/657; G06F 2212/225; G06F 2212/1016
See application file for complete search history.

(56) References Cited

U.S. PATENT DOCUMENTS 8,285,918 B2  10/2012  Maheshwari
8,719,488 B2   5/2014  Maheshwari
9,753,854 B1 *  9/2017  Bao .................. G06F 12/122
9,910,784 B2   3/2018  Maheshwari
9,916,241 B2   3/2018  McKean et al.
(Continued)

FOREIGN PATENT DOCUMENTS

CN    105404596    3/2016
CN    107193758    9/2017

OTHER PUBLICATIONS

R. Chen, Z. Qin, Y. Wang, D. Liu, Z. Shao and Y. Guan, "On-Demand Block-Level Address Mapping in Large-Scale NAND Flash Storage Systems," in IEEE Transactions on Computers, vol. 64, No. 6, pp. 1729-1741, Jun. 1, 2015.*

(Continued)

*Primary Examiner* — Pierre Miche Bataille
(74) *Attorney, Agent, or Firm* — Hewlett Packard Enterprise Patent Department

(57) ABSTRACT

A system may include a persistent storage device, a low latency cache device, a volatile memory; and a processor. The processor is to store a data structure in the volatile memory that is usable to directly translate a block logical address for targeted data to a candidate physical location on the cache device, store a multilevel translation index in the volatile memory for translating the block logical address for the targeted data to an expected physical location of the targeted data on the cache device and attempt accessing the targeted data at the candidate physical location retrieved from the direct cache address translation data structure. In response to the targeted data not being at the candidate physical address, access the targeted data at the expected physical location retrieved from the multilevel translation index.

20 Claims, 4 Drawing Sheets

(56) References Cited

U.S. PATENT DOCUMENTS

| | | | | |
|---|---|---|---|---|
| 10,067,796 | B1* | 9/2018 | Metcalf | G06F 9/544 |
| 2011/0023027 | A1* | 1/2011 | Kegel | G06F 12/1009 |
| | | | | 718/1 |
| 2011/0283048 | A1* | 11/2011 | Feldman | G06F 3/068 |
| | | | | 711/103 |
| 2013/0304991 | A1* | 11/2013 | Bottcher | G06F 12/0864 |
| | | | | 711/122 |
| 2014/0351388 | A1* | 11/2014 | Srinivasan | H04L 67/1097 |
| | | | | 709/219 |
| 2015/0100717 | A1* | 4/2015 | Bennett | G06F 9/45558 |
| | | | | 711/6 |
| 2018/0150392 | A1* | 5/2018 | Booss | G06F 12/023 |
| 2019/0164612 | A1* | 5/2019 | Solanki | G11C 16/3459 |
| 2020/0089617 | A1* | 3/2020 | Onishi | G06F 12/1009 |

OTHER PUBLICATIONS

Flash Memory Summit; "Design Issues for SCM-friendly Data Structure"; Aug. 8, 2017; 26 pages.

Ranganathan, S.; "Storage Class Memory: What's Next in Enterprise Storage"; Sep. 4, 2018; 13 pages.

\* cited by examiner

CACHE DATA LOCATION SYSTEM

BACKGROUND

Many computer storage systems may include a cache which holds copies of data that is stored on slower persistent media. The cache provides quicker access to data which is more frequently retrieved. Locating the physical location or physical address of the data on the cache may involve internal metadata lookups.

Figure 1:
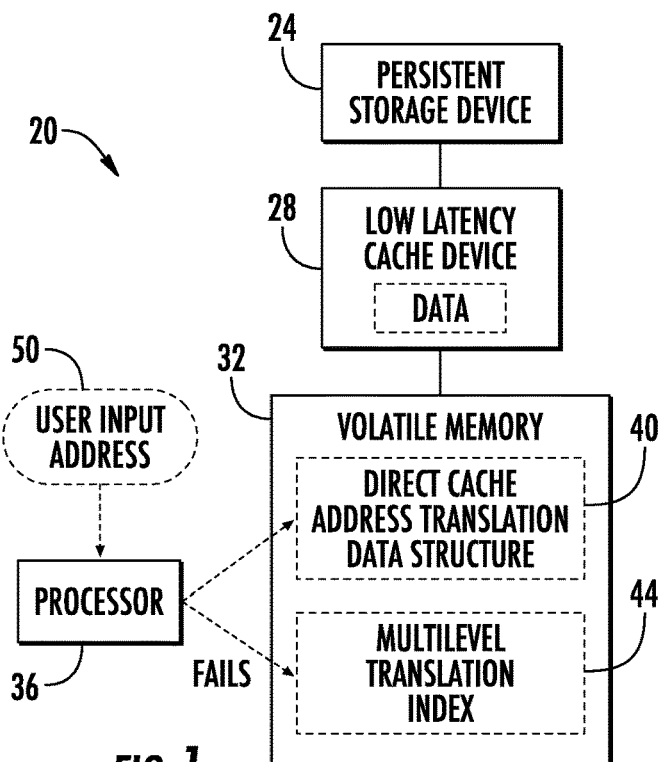
FIG. 1 is a block diagram schematically illustrating portions of an example cache data location system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example systems, methods and computer-readable instructions that reduce the time consumed to access data stored on a cache. The disclosed systems, methods and instructions reduce the time consumed to access data stored on the cache by reducing the time to identify the physical location of data on the cache, which may be referred to herein as a "cache physical location". With the advent of higher-speed cache memory, the time to locate data on the cache often becomes the bottleneck. The disclosed storage systems, methods and instructions address this bottleneck by using a less current, but direct and faster address translation data structure in combination with a more current, but slower multilevel address translation index (which may be referred to herein as a "multilevel translation index") in circumstances where the direct address translation is no longer current due to data movement or data removal.

In some implementations, copies of data stored on slower persistent media, such as a hard disk drive, are also maintained on a low latency cache device, such as a storage class memory (SCM) device. In such an implementation, the data stored on the low latency cache device may be accessed by using either or both of two different address translation mechanisms stored on volatile memory (e.g., DRAM, or the like). The volatile memory stores a direct cache address data structure, which may be implemented using a hash table. The volatile memory also stores a multilevel translation index that translates block logical addresses to respective cache physical addresses. For each of a plurality of block logical addresses (which may be referred to as "host addresses" or "user input addresses"), the faster direct cache address translation data structure may directly translate, a block logical address to a candidate physical address of a candidate physical location in the cache that may contain a current or prior version of requested or targeted data. In circumstances where the targeted data no longer exists at the candidate physical location identified by the direct cache address translation data structure, such as when the targeted data has been moved within the cache, the multilevel translation index is used to identify an actual physical address of an expected physical location in the cache that does contain the targeted data.

As disclosed above, the direct cache address translation data structure is first used to attempt to locate the targeted data identified by the block logical address. However, in many circumstances, the targeted data may no longer reside at the candidate physical location identified by the candidate physical address obtained from the direct cache address translation data structure based on the block logical address. This may be the result of the targeted data having been moved to a different location on the cache. For example, older data existing at a first physical location of the cache may be overwritten by newer data written to a second physical location of the cache, resulting in the older data no longer being current. During what is sometimes referred to as a "garbage collection" process, all of the current data is gathered and concentrated with other current data at other physical locations on the cache. For example, such a garbage collection process may copy the newer data at the second physical location to a third physical location of the cache, and may erase both the old data at the first physical location (which is no longer current data) and the newer data at the second physical location (which was initially used to overwrite the older data at the first physical location). Such a garbage collection process results in a change in the physical location of the newer data, which may be the targeted data in this example. When this change occurs, the multilevel translation index is updated to include the new physical location of the newer data (e.g., indicating the newer data being stored at the third physical location in the example above). In such examples, the multilevel translation index may be updated for all such current data that was moved. However, the direct cache address translation data structure (sometimes referred to herein as a direct logical block address to physical address translation data structure) may not updated at the time of each garbage collection process. This may result in a physical address retrieved or output from the direct cache address translation data structure (which may be referred to has a "candidate physical address" herein) being invalid in that it does not correspond to a physical location on the cache that actually contains the targeted data. In examples described herein, the physical location indicated by a candidate physical address may be referred to as a "candidate physical location".

Once the candidate physical address for a candidate physical location (that may contain the targeted data) has been obtained from the direct cache address translation data structure, the disclosed systems, methods and computer readable instructions verify that the targeted data actually resides at the candidate physical location. In one implementation, each physical location on the cache may store a first identifier which is directly associated with and moves with its assigned data (e.g. when the data is copied to another location, as in the garbage collection process). The entry in the direct cache address translation data structure that links the block logical address to the candidate physical address includes a second identifier associated with the data expected to reside at the candidate physical address. When the direct cache address translation data structure is first populated with the second identifier, the second identifier is the same as the first identifier stored with the data at the candidate physical location. However, once the data has been moved to a new location, such as a result of the above described garbage collection process, the candidate physical location may be empty of data or may actually store other data having an identifier that is different than the identifier associated with the block logical address and previously stored in the direct cache address translation data structure.

The disclosed systems, methods and computer readable instructions verify that the targeted data actually resides at the candidate physical location by comparing the two identifiers. If the two identifiers match, the data at the candidate physical location is the targeted data identified by the block logical address. If the two identifiers do not match, the data at the candidate physical location is not the targeted data identified by the block logical address. As a result, the systems, methods and computer readable instructions then defer to use of the multilevel translation index to locate the targeted data via a first mapping of the block logical address for the targeted data to a cache logical address, and a second mapping of that cache logical address to the expected (e.g., up-to-date) physical address of the targeted data in the cache. Although use of the multilevel translation index has increased latencies as compared to the direct cache address translation data structure due to the multiple levels or multiple translations, the multilevel translation index, being updated more frequently with the up-to-date locations for data as part of the garbage collection process, may provide a more up-to-date and accurate location for the targeted data.

Once the more up-to-date address for the "expected" physical location in the cache containing of the targeted data has been found in or retrieved from the multilevel translation index, the systems, methods and computer-readable instructions utilize the expected physical location for the targeted data to update or correct the direct cache address translation data structure. In particular, the old entry in the direct cache address translation data structure containing the incorrect or invalid candidate address for the targeted data is removed from the data structure and a new entry mapping the block logical address to the physical address for the expected physical location of the targeted data, as retrieved from the multilevel translation index, is added. In other words, the physical address for the expected physical location of the targeted data, output by the multilevel translation index, is cached in the direct cash address translation data structure. The "expected" physical location may be where the targeted data is more likely to reside as compared to any candidate physical location provided by the direct cash address translation data structure due to the more frequent updating of the multilevel translation index. Although possibly offering greater reliability as to the actual physical location for the targeted data, the physical address output for the expected physical location may, at times, be erroneous due to a variety of other potential causes. As a result, the term "expected" is used in the present disclosure when describing the physical address for the targeted data output by the multilevel translation index.

At initiation of a system, the direct cache address translation data structure may have entries for a given block logical address that are empty or may omit any entry corresponding to the block logical address. In response to identifying an empty entry or the lack of an associated entry for a block logical address, the multilevel translation index may be automatically consulted to identify the actual physical address of the expected physical location containing the data targeted by the block logical address. Once the actual physical address for the expected physical location of the data targeted by the block logical address has been identified through use of the multilevel translation index, empty entry for the block logical address in the data structure may be populated with the actual physical address for the expected physical location or the data structure may be populated with a new entry for the block logical address which includes the actual physical address for the expected physical location.

One example of such a multilevel translation index is an index which includes a first level which comprises a block index comprising a tree that maps, for each of a plurality of block logical addresses, a block logical address (e.g., a volume ID and offset, and which may be referred to as a "block logical address" or "host address") to a respective cache logical address (e.g., a user block (BU), and which may be referred to as a data identifier). The index further comprises second level including a cache index comprising a tree that maps, for each of a plurality of cache logical addresses, a cache logical address (e.g., the user block) to a respective actual physical address (e.g., segment ID and offset) for a cache physical location at which the data corresponding to (or targeted by) the block logical address is stored on the cache. The cache index is updated as the physical addresses of data in the cache changes. For example, the actual physical address (e.g., the segment ID and offset) of data corresponding to a cache logical address (e.g., user block) may be updated as the physical location of the data associated with the cache logical address changes (e.g., as a result of a garbage collection process, as described above).

In one implementation, the direct cache address translation data structure comprises a hash table. In one implementation, the hash table, for each of a plurality of block logical addresses, directly maps the block logical address (e.g., volume ID and offset, user input address, or host address) to a respective physical address (e.g., segment ID and offset) for a physical location in a cache, replacing the two tree walks of the multilevel translation index with a single hash table lookup. The hash table, serving as an acceleration index, may be considered a "metadata bypass cache" employed in the cache data location system to facilitate storage system addressing in the SCM cache layer without incurring the CPU cost of internal metadata lookups (e.g., by bypassing a lookup of a cache logical address in metadata).

In one implementation, a key for a lookup in the hash table may be based on the block logical address for targeted data. For example, a hash function may be applied to the block logical address to produce or obtain a "hash" of the block logical address. The hash or portions of the hash may serve as keys for carrying out a lookup in the hash table. For example, a portion of the hash of the block logical address (e.g., the hash without the last 4 bits of the hash) may be used as a first key into the hash table to identify a page which includes an entry containing the candidate physical address for a candidate physical location for (e.g., that may contain) the targeted data. The full hash may be used as a second key into the hash table to identify a specific location on the identified page for the entry containing the candidate physical address.

In one implementation, the hash table comprises a two-level table comprising an array of pointers to pages with key/candidate physical location (K/CPL) entries on each page. In one implementation, each page may have a size of no greater than 10 MB and wherein the pages comprises at least 200,000 pages. In one implementation, each page is 1 MB in size, where the hash table comprises 500,000 pages. In one implementation, each page comprises no greater than 50,000 K/CPL entries. Each K/CPL entry may map a logical block address (e.g., via a hash of the logical block address) to a candidate physical address in the entry. In one implementation of each page comprises 32,000 K/CPL entries.

In such implementations, the size of the pages (no greater than 10 MB and is some implementations, 1 MB) may be efficiently managed by a memory allocator. For example, if a unified allocator is to reclaim memory, pages may be discarded while only losing a small fraction of the hash table. Also, a separate lock (e.g., a spin lock) may be implemented for each page. In such implementations, since a number of pages is large, most accesses will not conflict on a lock. In such examples, each page may be protected with a lock, such as a spin lock, but the chance of a lock conflict for concurrent threads may be negligible. At the same time, the number of entries in a page is high so that space overhead of such a lock is minimal. Such sizing may achieve the inclusion of all entries for a large input/output (IO) under just one lock. For example, a single lock may protect each of the entries of a page (e.g., 32,000 entries). As a result, such implementations may provide page granular locking that is efficient and allows high concurrency.

In one implementation, a hash of the logical block addresses with the low four bits masked off is used as a key to select a page so that nearby logical block addresses (LBAs) end up in the same page. Inside each page, an array of Key/CPL values is indexed by the (full) hash of the logical block addresses as the key. In one example, the hash table is four-way set associative, meaning that there are four possible slots for each key. This arrangement may provide a high load factor with a low and deterministic probing cost. Performance may be enhanced since all possible locations for an element are contiguous in memory and may fit in two CPU cache lines.

In one implementation, the location of entry in the set serves as a proxy for its temperature. In such an implementation, the entries in the set are maintained in a least-recently used (LRU) order by promoting new and accessed entries to the top or most-recently used (MRU) end of the set and evicting the entry at the bottom or LRU end of the set (the least-recently used entry in the set) when a new entry is inserted into a full set. As a result, the position in the set is used as an indicator of temperature of the entry. Thus, LRU cache policy may be approximated with little or no space overhead.

Although use of a hash table to implement the direct address translation data structure in some examples may result in collisions and evictions which cannot be addressed at a high load factor, the additional inclusion of the multilevel translation index addresses such concerns. Since the direct address translation data structure is a cache itself, misses are acceptable as they are resolved by a data translation path through the multilevel address translation index, albeit at a somewhat higher latency.

Disclosed is an example system that may include persistent storage device(s), low latency cache device(s), volatile memory, and at least one processor. The processor is to execute instructions to store a direct address translation data structure in the volatile memory that is usable to directly translate a block logical address for targeted data to a candidate physical address of a candidate physical location on the cache device, store a multilevel translation index in the volatile memory for translating the block logical address for the targeted data to an actual physical address for an expected physical location containing the targeted data on the cache device, and determine whether the targeted data resides at the candidate physical location corresponding to the candidate physical address retrieved from the direct cache address translation data structure. In response to the targeted data residing at the candidate physical location, the processor may execute instructions to access the targeted data at the candidate physical location. In response to the targeted data not residing at the candidate physical address, the processor may execute instructions to access the targeted data at the expected physical location retrieved from the multilevel translation index.

Disclosed is an example method that comprises storing a data structure in a volatile memory that directly translates a block logical address for targeted data to a candidate physical address of a candidate physical location on a cache device, storing a multilevel translation index in the volatile memory that is usable to translate the block logical address for the targeted data to an actual physical address for expected physical location on the cache device; and determining if the targeted data resides at the candidate physical location corresponding to the candidate physical address retrieved from the direct cache address translation data structure. In response the targeted data not residing at the candidate physical address, the targeted data is accessed at the expected physical location corresponding to an actual physical address retrieved from the multilevel translation index. In addition, the expected physical location retrieved from the multilevel translation index is cached in the direct cache address translation structure, resulting in an automatic update of the direct cache address translation structure.

Disclosed is an example non-transitory computer-readable medium that contain instructions for a processor. The instructions are executable by the processor to direct a processor to receive a block logical address for targeted data, directly translate the received block logical address to a candidate physical address using a direct cache address translation data structure and determine whether the targeted data resides at a candidate physical location in a cache corresponding to the candidate physical address. In response to the targeted data residing at the candidate physical location, the instructions are executable by the processor access the targeted data at the candidate physical location. In response to the targeted data not residing at the candidate physical location, the instructions are to direct the processor to use a multilevel translation index to translate the block logical address to a cache logical address, translate the cache logical address to an actual physical address and access the targeted data at the actual physical address (e.g., an expected physical location in the cache corresponding to the actual physical address). In some implementations, the instructions further use the results from the multilevel translation index to automatically update the direct cache address translation data structure.

FIG. 1 is a block diagram schematically illustrating portions of an example cache data locating system 20. System 20 may reduce the time consumed to locate and access data stored on a cache. System 20 may reduce the time consumed to access data stored on the cache by reducing the time to identify the physical location of data on the cache. System 20 comprises persistent storage device(s) 24, low latency cache device(s) 28, volatile memory 32, and at least one processor 36.

Persistent storage device(s) 24 comprise one or more nonvolatile storage devices to store data to be accessed, retrieved or read therefrom. Persistent storage device(s) 24 further comprise a region on which data may be copied or written. In examples described herein, persistent storage device(s) (such as persistent storage device(s) 24) may be implemented by hard disk drive(s) (HDD(s)), solid state drive(s) (SSD(s)) (e.g., flash memory device(s)), or the like, or a combination thereof.

Low latency cache device 28 comprises a memory storage device that stores copies of at least some of the data (schematically represented in broken lines) also stored on persistent storage device(s) 24. Low latency cache device 28 has a latency or response time less than that of persistent storage device(s) 24. As a result, low latency cache device 28 facilitates the access to copies of data in a more timely manner. In one implementation, low latency cache device 28 comprises low latency persistent storage device(s) or non-volatile memory device(s). In one implementation, low latency cache device 28 comprises one or more storage class memory (SCM) devices. In examples described herein, SCM may be a type of non-volatile memory (NVM) technology. In some examples, SCM may communicate using a protocol consistent with NVM Express™ (NVMe™). In examples described herein, an SCM device may be implemented in any one of a plurality of different forms, such as, for example, a 3D XPoint chip (or device), a 3D XPoint DIMM, Phase Change Memory (PCM) device (such as Phase-Change random-access memory (RAM) device), a Magnetic RAM (MRAM) device (such as Spin-Torque-Transfer (STT) RAM device), a Resistive RAM (RRAM) device, a memristor device, or the like, or a combination thereof. In some examples, the SCM may implement block-based access. In other examples, SCM may implement memory-based semantics for data access. In one implementation, persistent storage device(s) 24 comprises a hard drive or solid state drive having a response time for a given amount of data of about 10,000 μs. By comparison, the low latency cache device 28, in the form of a SCM, has a response time for the same data of approximately 10 μs. In some examples, a low latency cache device may be a byte-addressable nonvolatile storage device. In some examples, a persistent storage device may be a block-addressable nonvolatile storage device.

Volatile memory 32 is volatile in that data store nonvolatile memory 32 is lost in the prolonged absence of power being supplied to memory 32. In one implementation, volatile memory 32 comprises random-access memory, such as dynamic random-access memory (DRAM). Volatile memory 32 may have a response time less than that of low latency cache device 28. In one implementation, low latency cache device 28 in the form of an SCM has a response time of 10 μs for the given amount of data, whereas the volatile memory in the form of DRAM has a response time for the same given amount of data of approximately 0.1 μs.

Processor 36 manages the accessing of data on low latency cache device 28. Processor 36 may be in the form of an application-specific integrated circuit or other processing unit (e.g., physical hardware) that executes instructions, code, programming or circuit logic so as to manage the accessing of data of low latency cache device 28. The instructions or circuit logic that drive processor 36 cause processor 36 to store a direct cache address translation data structure 40 in volatile memory 32. In one implementation, the direct address translation data structure 40 directly maps logical block addresses (e.g., each a volume ID and offset) to a respective candidate physical address (e.g., segment ID and offset) for data being targeted.

Because the address translation is direct (rather than traversing multiple tables or trees), data structure 40 may facilitate much faster and more responsive locating of a physical address at which data requested by user may be accessed. In implementations where the data being accessed is stored on the low latency cache device, such as an SCM memory device, the use of the direct address translation table 40 reduces the time or cost associated with locating the physical address of the data, the bottleneck in the total time to access the data. In one implementation, the direct cache address translation data structure 40 may comprise a hash table. For example, a hash function may be applied to the block logical address, wherein the resulting hash serves as a key for a lookup or lookups in the hash table. In other implementations, the direct address translation data structure 40 may comprise other data structures such as a search tree.

The instructions or circuit logic that drive processor 36 also cause processor 36 to store a multilevel address translation index 44 in volatile memory 32. The multilevel address translation index 44 may serve as an authoritative (i.e., up to date) backup for when use of the less authoritative direct address translation data structure 40 is unsuccessful, such as when the physical address of the data requested by user on the cache device 28 has changed and the direct cache address translation data structure 40 has not yet been updated to reflect the change. The multilevel translation index 44 is more "authoritative" as compared to the direct address translation data structure 40 in that the multilevel translation index 44 may be more current or up-to-date with respect to the physical location of targeted data on the cache due to more frequent updating of the multilevel translation index 44 with the expected physical locations of data in the cache 28 (as that data is moved to different locations in the cache 28) as compared to the direct cache address translation data structure 40. One example of such a multilevel translation index 44 is an index which includes a first level which comprises a block index comprising a tree that maps block logical addresses (e.g., each a volume ID and offset) (the block logical address) to respective cache logical address (e.g., a respective user block identifier). The index further comprises second level including a cache index comprising a tree that maps the cache logical addresses to respective actual physical addresses in the cache (e.g., each a segment ID and offset) that may be used to physically locate the data on the cache. The cache index is updated as the respective physical addresses of data on the cache changes.

Figure 2:
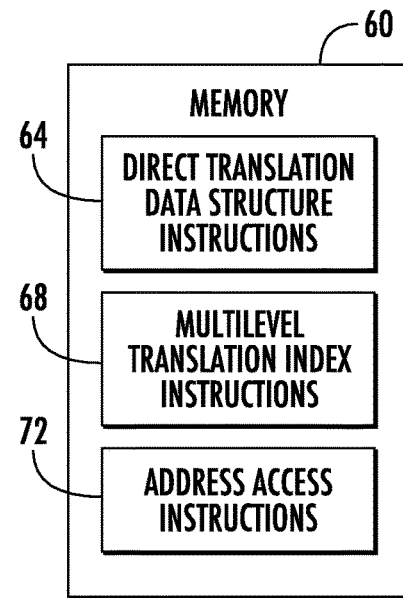
FIG. 2 is a block diagram schematically illustrating portions of an example non-transitory computer-readable medium storing example cache data location instructions.
Figure 3:
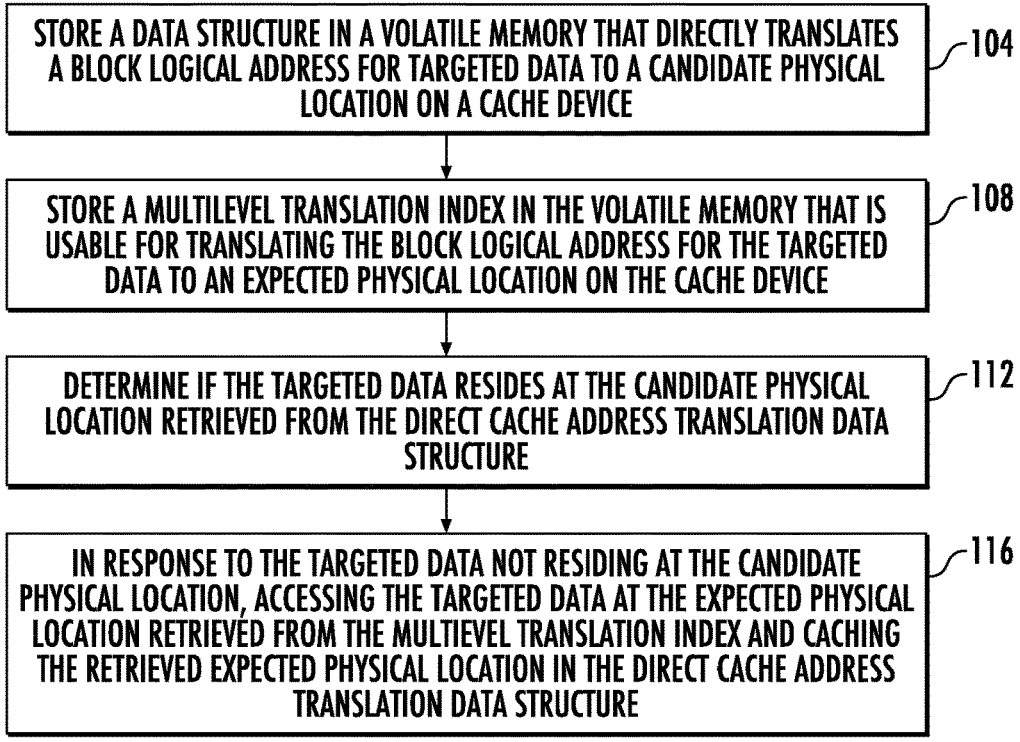
FIG. 3 is a flow diagram of an example cache data location method.

FIG. 2 is a block diagram illustrating portions of an example non-transitory computer-readable medium 60 containing instructions executable by a processor, such as processor 36, to manage the accessing of data stored on a low latency cache (e.g., implemented by cache device(s), such as device(s) 28). In one implementation, processor 36 follows the instructions contained in memory 60. FIG. 3 is a flow diagram of an example method 100 that may be carried out by system 20 with processor 36 following the instructions provided in memory (or other machine-readable storage medium) 60. As should be appreciated, memory 60 may be utilized with cache data locating systems 20. Likewise, method 100 may be carried out with any of the following described cache data locating systems or a similar storage systems.

As shown by FIG. 2, memory 60 comprises direct translation data structure instructions 64, multilevel translation index instructions 68 and address access instruction 72. Instructions 64 comprise programming, code or circuit logic that direct processor 36 to carry out block 104 of method 100 shown in FIG. 3. In particular, instructions 64 direct processor 36 to store a data structure, such as data structure 40, in a volatile memory, such as volatile memory 32, that directly translates block logical addresses to respective candidate physical addresses for respective candidate physical locations on a cache device, such as cache device(s) 28, as described above. In one implementation, instructions 64 are executable to establish, create and store a direct translation data structure 40 in the form of a hash table (as described above) in volatile memory 32.

Multilevel translation index instructions 68 comprise programming, code or circuit logic executable to direct processor 36 to carry out block 108 of method 100 shown in FIG. 3. Instructions 68 direct processor 36 to create, store and maintain a multilevel translation index, such as index 44, in volatile memory 32 for translating block logical addresses to respective actual physical addresses for respective expected physical locations on cache device(s) 28, as described above. As described above, in some implementations, the multilevel translation index 44 created and stored may include a first level which comprises a block index comprising a tree that maps block logical addresses (e.g., each a volume ID and offset) to a respective cache logical address (e.g., a respective user block). The index 44 further comprises second level including a cache index comprising a tree that maps the cache logical addresses to respective actual physical addresses (e.g., each a segment ID and offset) which may be used to physically locate data on the cache. The cache index is updated as the physical address of particular data on the cache changes.

Address access instructions 72 comprise programming, code or circuit logic executable to direct processor 36 to carry out blocks 112, 114 and 116 of method 100 in FIG. 3. As indicated by block 112, in response to processor 36 receiving a block logical address 50 (shown in FIG. 1), address access instructions 72 direct processor 36 to first determine whether the data being targeted by the block logical address 50 resides at the candidate physical address retrieved from the direct cache address translation data structure. To make such a determination, instructions 70 direct processor 36 to retrieve the candidate physical address for the targeted data from the direct cache address translation data structure 40. In one implementation in which the direct cache address translation data structure 40 comprises a hash table, a hash of the block logical address (or portions thereof) may serve as keys for the hash table (as described above) to obtain a candidate physical address for the piece of data on cache 28. For example, in one implementation, the hash table directly maps a hash of the block logical address (the volume ID and offset) to the segment ID and offset (the candidate physical location or address), replacing the two tree walks of the multilevel translation index with a single hash table lookup. The hash table, serving as an acceleration index, is a metadata bypass cache employed in the memory storage system to facilitate storage system addressing in the SCM cache layer without incurring the CPU cost of internal metadata lookups.

Once the candidate physical location address has been retrieved, the determination is then made as to whether the targeted data resides at the retrieve candidate physical location. In one implementation, the determination is made by comparing two identifiers. In one implementation, each physical location on the cache has stored a first identifier which is directly associated with and moves with its assigned data. The entry in the direct cache address translation data structure that links the block logical address to the candidate physical location includes a second identifier associated with the data believed to reside at the candidate physical location. When the direct cache address translation data structure is first populated with the second identifier, the second identifier is the same as the first identifier stored at the candidate physical location. However, once the data has been moved to a new location, such as a result of the above described garbage collection process, the candidate physical location may be empty of data and an identifier or may actually store other data having an identifier that is different than the identifier associated with the block logical address and previously stored in the direct cache address translation data structure. A comparison of the two identifiers indicates whether the data associated with the block logical address actually resides at the candidate address. If the two identifiers match, the data at the candidate physical location is the targeted data identified by the block logical address and the targeted data may be accessed. If the two identifiers do not match, the data at the candidate physical location is not the targeted data identified by the block logical address.

As indicated by block 116 in method 100, in response to the targeted data not residing at the candidate physical location, such as the candidate physical location not containing any data or containing data different than the targeted data corresponding to the block logical address, address access instructions 72 direct the processor 36 to access the physical location or address corresponding to the block logical address retrieved from the multilevel translation index 44. In particular, processor 36 carries out a first tree lookup in a block index mapping the block logical address (a volume ID and offset) to a user block (which may be the first identifier). Instructions 72 then direct the processor 36 to carry out a second tree lookup in a cache index that maps the user block to a segment ID and offset (the expected physical address or location in cache 28) which may be used to physically locate the targeted data on the cache 28.

Figure 4:
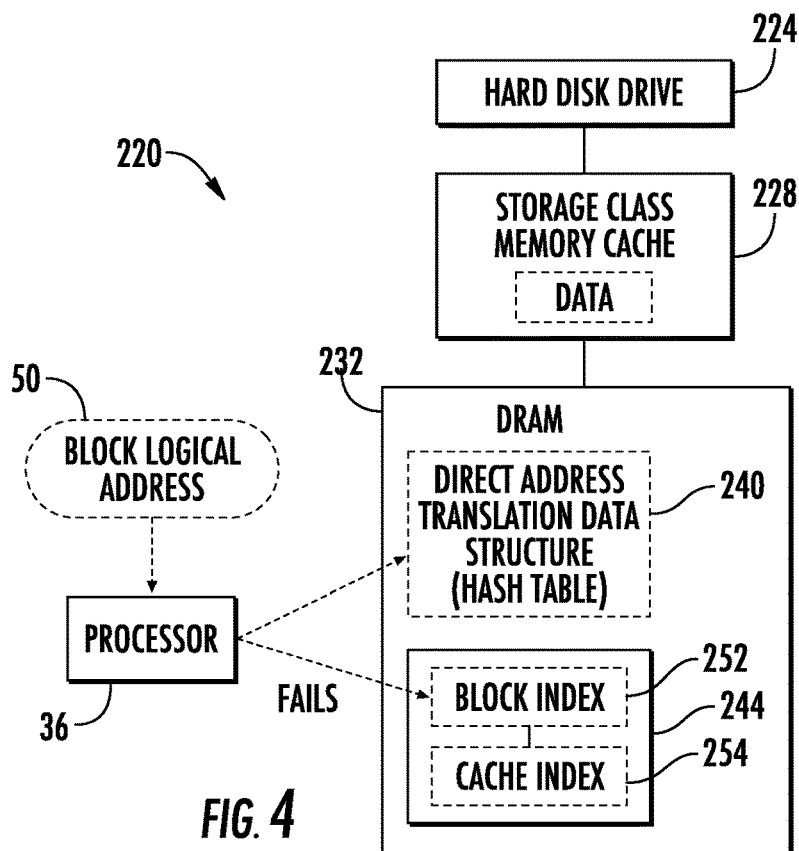
FIG. 4 is a block diagram schematically illustrating portions of example cache data location system.

FIG. 4 is a block diagram schematically illustrating portions of an example cache data location system 220. System 220 is similar to system 20 described above except that system 220 specifically comprises persistent storage device(s) 224 in the form of at least one SSD, at least one HDD, or a combination thereof, a low latency cache device 228 in the form of storage class memory cache, a volatile memory 232 in the form of DRAM, a direct address translation data structure 240 in the form of a hash table, and a multilevel address translation index 244 in the form of an index having a block index 252 and a cache index 254. The remaining components of system 220 which correspond to components of system 20 are numbered similarly. In some implementations, the persistent storage device 224 may comprise a hard disk drive or a combination of a solid-state drive and hard disk drive. As described above, block index 252 comprises a tree that maps a volume ID and offset to a user block. Cache index comprises a tree that maps the user block to a segment ID and offset which may be used to physically locate the data on the cache. The cache index 254 is updated as the physical address of particular data on the cache changes.

Figure 5:
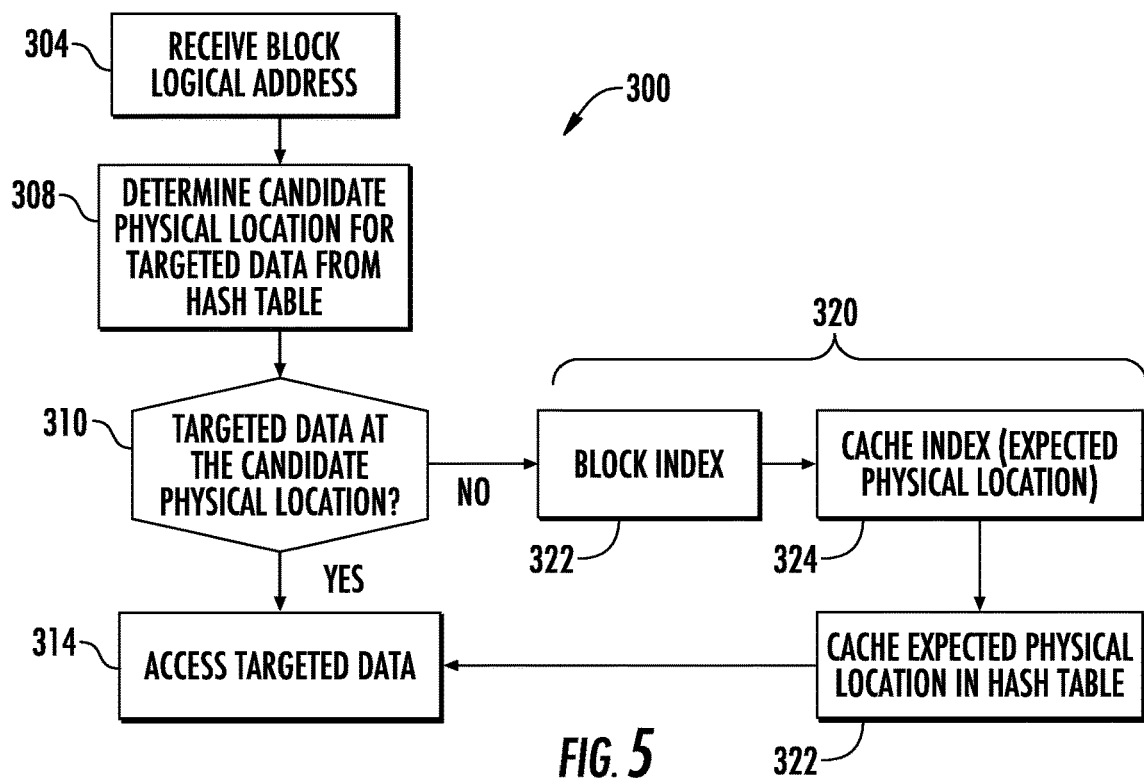
FIG. 5 is a flow diagram of an example cache data location method.

FIG. 5 is a flow diagram of an example cache data locating method 300. Method 300 is described in the context of being carried out by system 220. As should be appreciated, method 300 may be described by any of the systems described herein or by other similar storage systems.

As indicated by block 304, cache data location system 220 receives a request from a user to access a copy of data stored in memory 228. System 220 receives a block logical address or a host address. In one implementation, the block logical address comprises or corresponds to a volume ID and offset.

As indicated by block 308, processor 36, following instructions, such as instructions contained in memory 60 described above, determines or identifies a candidate address for the data targeted by the block logical address using the hash table of the direct cache address translation data structure. In other words, processor 36 attempts to identify the physical address on cache 228 which corresponds to the block logical address by using the direct address translation hash table 240. The direct address translation hash table 240 provides a direct translation from the block logical address to the physical address on cache 228. In particular, a hash function is applied to the block logical address, wherein the resulting hash serves as a key to carry out a lookup in the hash table for the candidate physical location of the targeted data. In one implementation, the direct address hash table is used to translate the volume ID and offset (block logical address or logical block address) to a segment ID and offset (the candidate physical location) of cache 228 without multiple tree index lookups.

As indicated by block 310, processor 36, following instructions contained memory 60, determines whether the direct cache address translation data structure used in block 308 has identified a candidate physical address corresponding to the block logical address (e.g., where the requested piece of data is stored) has been found. For example, in circumstances where the physical address of the particular targeted piece of data or copy of data on cache 228 has been moved, the targeted data may not actually reside at the candidate physical location obtained from the direct cache address translation data structure.

In one implementation, the determination is made by comparing two identifiers. In one implementation, each physical location on the cache has stored a first identifier which is directly associated with and moves with its assigned data. The entry in the direct cache address translation data structure that links the block logical address to the candidate physical location includes a second identifier associated with the data believed to reside at the candidate physical location. When the direct cache address translation data structure is first populated with the second identifier, the second identifier is the same as the first identifier stored at the candidate physical location. However, once the data has been moved to a new location, such as a result of the above described garbage collection process, the candidate physical location may be empty of data and an identifier or may actually store other data having an identifier that is different than the identifier associated with the block logical address and previously stored in the direct cache address translation data structure. A comparison of the two identifiers indicates whether the data associated with the block logical address actually resides at the candidate address. If the two identifiers match, the data at the candidate physical location is the targeted data identified by the block logical address. If the two identifiers do not match, the data at the candidate physical location is not the targeted data identified by the block logical address.

As indicated by block 314, if the correct physical address of the requested data (based upon the block logical address) has been found, processor 36 accesses the physical address on cache device 228. Such access may involve reading data from the particular physical address or writing data to the particular physical address.

Alternatively, as indicated by block 316, in response to the cache data locating method carried out in block 308 not identifying the correct physical address for the requested data, processor 36, following instruction contained in memory 60, carries out a multilevel translation index search 320. As indicated by block 322, processor 36 carries out a first tree lookup in a block index mapping the user input (a volume ID and offset) to a user block. As indicated by block 324 processor 36 carries out a second tree lookup in a cache index that maps the user block to a segment ID and offset (the physical address in cache 28) which may be used to identify an expected physically location for the targeted data on the cache 28 per block 314.

As indicated by block 322, the expected physical location retrieved from the multilevel translation index search 320 is cached in the hash table. As a result, the direct cache address translation data structure is automatically updated with address information from the more frequently updated multilevel translation index as errors are found in block 308.

Figure 6:
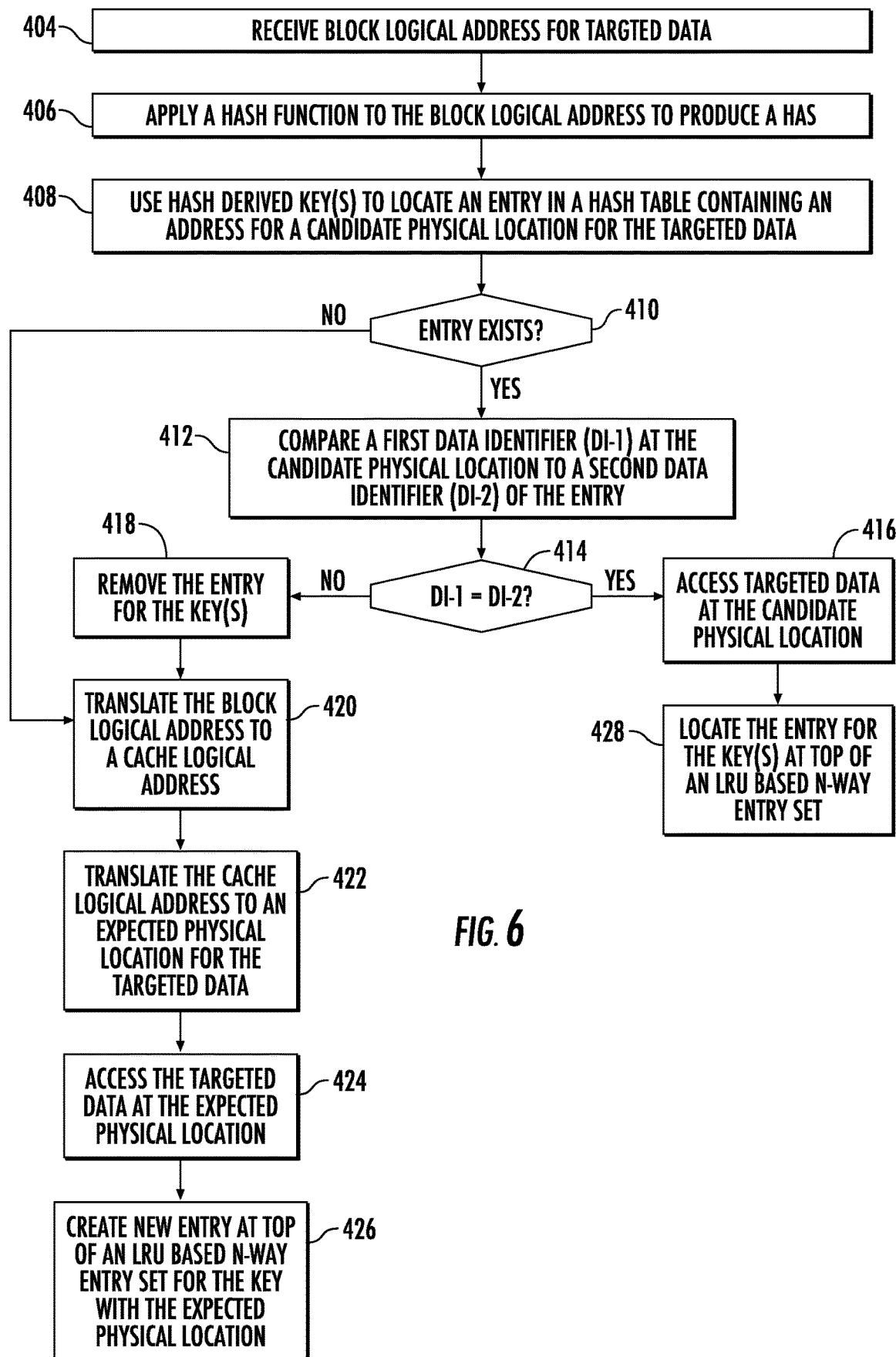
FIG. 6 is a flow diagram of an example cache data location method.

FIG. 6 is a flow diagram of an example cache data locating method 400 to locate data on a cache. Although method 400 is described in the context of being carried out by system 220 (shown and described above with respect to FIG. 4), method 400 may likewise be carried out by system 20 or other similar cache data locating systems or similar storage systems. The blocks of method 400 may be carried out by processor 36 following instructions stored on a non-transitory computer-readable medium. In one implementation, method 400 may be carried out by a processor following instruction contained in a non-transitory computer-readable medium or memory, such as memory 60, wherein instruction 64, 68 and 72 because processor 36 to carry out method 400.

As indicated by block 404, cache data location system 220 receives a request from a user to access targeted data stored in memory 228. System 220 receives a block logical address, sometimes also referred to as a host address or block logical address (BLA). The block logical address is different than the address of the physical location on the cache storing the target address. Method 400 facilitates the identification of the actual physical address on the cache storing the data identified by the user with the provided block logical address. In one implementation, the block logical address comprises or corresponds to a volume ID and offset.

Blocks 406 and 408 illustrate one example of directly translating the block logical address to a physical location, a cache physical address that is a candidate for storing the data being sought by the block logical address, the targeted data. Blocks 406 and 408 may be carried out by processor 36 following instructions contained in a medium 60, such as instruction 68. In block 406, a hash function is applied to the received block logical address. In the example illustrated, the hash function is applied to the block logical address, comprising a volume plus offset to produce a hash value.

In block 408, instructions on the non-transitory computer-readable medium direct processor 36 to derive at least one key from the hash value, wherein a lookup is performed in a hash table using the at least one key to identify an entry containing an address for a candidate physical location in the low latency cache device for the targeted data. The candidate physical location is a physical location in the cache (the low latency cache device, such as device 28 shown in FIG. 1) at which the targeted data was known to reside at the time of the most recent lookup.

In one implementation, following instructions contained in the medium, processor 36 utilizes a first portion of the resulting hash as a first key for the hash table to identify a particular page, from amongst a plurality of pages, for the entry. Following instructions contained in the medium, the processor 36 utilizes the full resulting hash as a second key for the hash table to identify where on the particular page the entry is located. In other implementations, a single key derived from the resulting hash or more than two keys derived from the resulting hash may be used to locate the entry in the hash table that contains the candidate physical address or cache address for the targeted data.

As will be described hereafter respect to FIG. 7, in some implementations, a limited number of entries are maintained for a limited number of corresponding potential block logical addresses. In such implementations, entries linking block logical addresses (or keys derived from hashes of the block logical addresser) to candidate physical locations are maintained for just the most active block logical addresses or block logical addresses. In decision block 410, the instructions direct processor 36 to determine whether an entry corresponding to the block logical address or key exists. In other words, a determination is made as to whether an entry in the direct cache address translation data structure associated with key derived from the hash or hash value exists. In the above described example in which the entries are stored in distinct pages, a conclusion that an entry for the block logical address or key does not exist may be made in circumstances where the keys derived from the hash, resulting from the application of the hash function to the block logical address, do not correspond to any pages in the direct cache data locating data structure.

In circumstances where the direct cache address translation data structure contains an entry corresponding to the key derived from the hash, the instructions direct the processor 36 to then verify the validity of the entry, to verify that the address for the candidate physical location for the targeted data found in the entry actually contains the targeted data. In addition to containing the address for the candidate physical location for the targeted data, the entry found in block 408 contains a second data identifier (DI-2). The second data identifier identifies the data that corresponds to the block logical address, the targeted data. In the example illustrated, the entry that contains the address for the candidate physical location may also contain other information such as the length of the data stored at the candidate physical location. Each entry associated with a different block logical address may have a corresponding first data identifier.

When data is being written to the cache, the data is assigned a first data identifier D1-1. The second data identifier, sometimes referred to as a block unit (BU) is assigned to the data itself, independent of the physical location at which the data is presently stored. The first data identifier D1-1 and the second data identifier D1-2 facilitate a determination of whether the candidate physical location, whose address is found in the entry, actually contains the targeted data.

As indicated by blocks 412 and 414, the instructions direct processor 36 to read the first data identifier stored at the candidate physical location, corresponding to the actual data stored at the candidate physical location, and compare the first data identifier to the second data identifier (DI-2) in the entry. As indicated by block 416, if the first data identifier read from the candidate physical location equals the second data identifier stored in the entry (part of the direct cache location data structure), process 36 concludes that the data stored at the candidate physical location identified by the address in the entry corresponding to the block logical address is the same data being targeted by the block logical address. As a result, the instructions direct processor 36 to access the targeted data at the candidate physical location. As described above, such access may involve altering the existing data at the candidate physical location or reading the data at the candidate physical location, where such reading does not alter the data.

As indicated by block 418, in response to the first data identifier read from the candidate physical location not being the same as the second data identifier stored in the entry that includes the address of the candidate physical location, processor 36 concludes that the targeted data no longer resides at the candidate physical location; the data at the candidate physical location is not the targeted data corresponding to the block logical address. As a result, the instructions direct the processor 36 to disassociate the candidate physical address in the entry from the block logical address (block logical address) for the targeted data. In the example illustrated, such disassociation involves the complete removal of the entry corresponding to the block logical address or key.

As indicated by blocks 420 and 422, in response to either the lack of any entry in the direct cache data locating structure (hash table in the example) corresponding to the block logical address or key or in response to the entry existing, but containing an address for a candidate physical location that does not contain the targeted data (D1-1 not being equal to D1-2), method 400 automatically resorts to using the multilevel translation index to attempt to locate the physical location on the cache for the targeted data. Blocks 420 and 422 illustrate one example for the translation of the block logical address to an expected physical location or cache address for the targeted data using a multilevel translation index. As indicated by block 420, the instructions direct processor 36 to translate the block logical address to a cache logical address. As indicated by block 422, following retrieval or identification of the cache logical address, the instructions direct the processor 36 to translate the cache logical address to an expected physical location (cache physical location or address) for the targeted data.

The "expected" physical location is an address provided by the multilevel translation index for the physical location expected to contain the targeted data. Although it cannot be necessarily guaranteed that the targeted data will reside at the expected physical location or the address of the expected physical location provided by the multilevel translation of blocks 420 and 422, the expected physical location may be more authoritative than the candidate physical location provided by the direct cache location data structure and output in blocks 406 and 408. As described above, the expected physical location is more authoritative than the candidate physical location in that the expected physical location may be more likely to presently contain the targeted data as the multilevel translation index used for carrying out block 420 and 422 is more frequently updated following movement of data within the cache, such as a result of the above described garbage collection processes. In contrast, in one implementation, the direct cache location data structure may just be updated in response to a candidate physical location miss (per block 414) or upon initiation of the system when entries may not exist as of yet (per block 410).

As indicated by block 424, the expected physical location for the targeted data corresponding to the block logical address may then be used to access the targeted data. This may be done directly or may involve returning to block 408 with the direct cache location data structure having been updated as described below.

As indicated by block 426, following the identification of the expected physical location for the targeted data in block 422, the retrieved expected physical location is used to update the direct cache address translation structure. In one implementation, the physical address for the expected physical location of the targeted data retrieved from the multilevel translation index is cached in the direct cache address translation data structure. In the example illustrated where invalid entries for a block logical address or key (entries where the identified D1-1 is not equal to D1-2) are completely removed from the direct cache data locating data structure (hash table in the example), the direct cache address translation data structure is updated by adding a brand-new complete entry to the direct cache address translation data structure, the new entry associating the block logical address or key with the address of the expected physical location of the targeted data and its first data identifier D1-1.

In other implementations, the updating of the direct cache address translation structure may be made in other fashions. For example, unpopulated entries for keys may be maintained, where the entry is populated with the address of the expected physical location for the targeted data was retrieved from the multilevel translation index. Rather than completely removing the entire populated entry for the key in block 418, the invalid portion of the entry, the address for the candidate physical location on the cache incorrectly believed to contain the targeted data, may be overwritten, removed and replaced or otherwise modified to alternatively include the address for the expected physical location as identified in retrieved from the multilevel translation index in blocks 420 and 422.

In the example illustrated, method 400 conserves storage space by not necessarily storing an entry for every block logical address in the direct cache address translation data structure. In the example illustrated, the direct cache address translation data structure comprises N-way entry sets, which means that there are n possible entry slots regions of available storage space for each block logical address or key. In other words, more than N block logical addresses or keys may be preassigned to a corresponding set, but only N entries are available for the block logical addresses or keys assigned to the set. When the set is full, all four slots are occupied with an entry for a corresponding key, the addition of a new entry for a new key may result in a current entry for another key being evicted from the set. The use of the N-way entry sets in the direct cache address translation data structure provides high load factor with low and deterministic probing cost. In one implementation, the direct cache address translation data structure employs 4-way entry sets. In other implementations, the direct cache address translation data structure may employ other sized N-way sets.

In the example illustrated, method 400 maintains the entries in each set in a least recently used (LRU) order by promoting new and accessed entries to the top (most recently used (MRU) end) and evicting the bottom (LRU) entry when a new entry is inserted into a full set. As a result, method 400 utilizes a position in the set as an indicator of a "temperature" of the entry, i.e. how active is the entry. As a result, the size of the direct cache address translation data structure may be regulated with little space overhead. As indicated by block 426, when a new entry is created that includes the address for the expected physical location, it is placed at the top (MRU end) of its predesignated set. Likewise, as indicated by block 428, when an existing entry has been validated and the targeted data at the candidate physical location identified by the address in the entry has been accessed, the entry containing the address for the candidate physical location is located at the top (MRU end) of its designated set. In circumstances where the entry is already at the top of its designated set, no action occurs. In circumstances where the entry is not at the top, the entry is moved or relocated to the top of its designated set of entries. In other implementations, other schemes may be employed for evicting existing entries in the N-way sets of the direct cache address translation data structure when a new entry is to be added to a full set.

Figure 7:
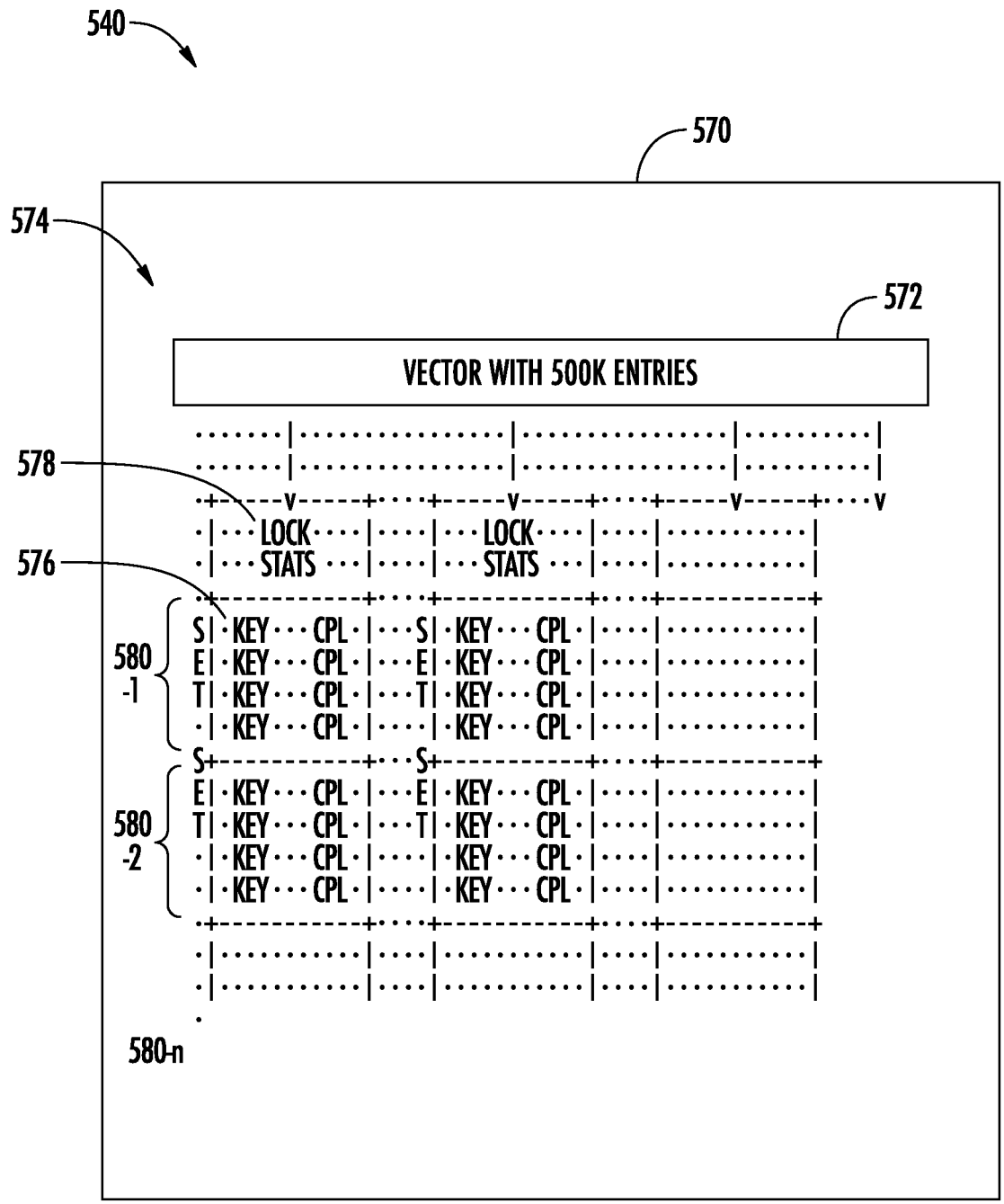
FIG. 7 is a diagram illustrating portions of an example direct cache address translation data structure in the form of an example hash table.

FIG. 7 is a diagram illustrating an example direct cache address translation structure 540 serving as an acceleration index or a metadata bypass cache which utilizes a hash table 570. Direct cache address translation data structure 540 may be employed as part of method 400. In the example illustrated, hash table 570 comprises a two-level table comprising an array of pointers (vectors 572) to pages 574 (one of which is shown) with a plurality of key to candidate physical location (K/CPL) entries 576 on each page. Each K/CPL entry may comprise a mapping of a key (the product of a hash function applied to the block logical address or host address) to a candidate physical address on a cache corresponding to the block logical address or host address. In one implementation, each page 574 may have a size of no greater than 10 MB and wherein the pages comprises at least 200,000 pages. In one implementation, each page is 1 MB in size, where the table 570 comprises 500,000 pages. In one implementation, each page 574 comprises no greater than 50,000 K/CPL entries 576 (block logical address to physical address entries). In one implementation of each page comprises 32,000 K/CPL entries.

In such implementations, the size of the individual pages 574 (no greater than 10 MB and in some implementations, 1 MB) may be efficiently managed by a memory allocator. For example, if a unified allocator is to reclaim memory, pages may be discarded while only losing a small fraction of the hash table. In such implementations, since a number of pages 574 is large, most accesses will not conflict on a lock. In other words, each page 574 may be protected with a lock, such as a spin lock 578, but where the chance of a lock conflict for concurrent threads may be negligible. At the same time, the number of entries 576 in a page is high so that space overhead of such a lock is minimal. Such sizing may achieve the inclusion of all entries for a large input/output (IO) under just one lock. For example, a single lock may protect each of the block logical address to physical address entries of the direct cache data locating structure 540, such as each of the 32,000 entries (corresponding to 32,000 potential block logical addresses or the "keys" (resulting from the application of a hash function to the block logical addresses) in the one example. As a result, such implementations provide page granular locking that is efficient and allows high concurrency.

In one implementation, to select an appropriate page 574 for a given key, a hash function is applied to the block logical address and certain bits (e.g., the low four bits) of the resulting hash are masked off, and the remaining bits of the hash are used to select the appropriate page 574 for the given key. By using this technique to select a page mappings for nearby block logical addresses (e.g., logical block address (LBAs)) are likely to end up in the same page. Inside each page 574, an array of K/CPL pairs are indexed by the respective keys. In one example, the hash table is four-way set associative, meaning that there are four possible slots for each key. This arrangement provides a high load factor with a low and deterministic probing cost. Performance is enhanced since all possible locations for an element are contiguous in memory and fit in two CPU cache lines.

In one implementation, for each of the sets 580-1, 580-2 . . . 580-n (collectively referred to as sets 480) of a table 570, K/CPL entries are stored in a set based on how recently each entry has been accessed (relative to the other entries in the set). As such, a K/CPL entry's relative location within a set 580 may serve as a proxy for its "temperature"

(i.e., how recently the entry has been accessed). In such an implementation, the K/CPL entries in the sets 580 are maintained in a LRU order by promoting new and accessed entries to the top or MRU end of the set and evicting the bottom or LRU entry in the set when new entry is inserted into a full set. As a result, the position in the set is used as an indicator of temperature of the entry. Thus, LRU cache policy may be approximated with little or no space overhead.

In one implementation, a typical block size is 4 kB. A K/CPL entry may be approximately 32 bytes. As a result, the AI/data structure 540 to the data size ratio is 32/4096, 0.7%. For example, 1.5 TB cache device may utilize only 12 GB of main memory. Absent use of data structure 540, a design may alternatively use this same 12 GB to store a fraction of the data in the cache. Data structure 540 facilitates fast access to the entire cache device.

Although use of the direct address translation data structure 540, such as a hash table 570, may result in collisions and evictions which cannot be addressed at a high load factor, the additional inclusion of the multilevel translation index addresses such concerns. Since the direct address translation data structure is a cache itself, misses are acceptable as they are resolved by a data translation path through the multilevel address translation index, albeit at a somewhat higher latency.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A method comprising:
    storing a direct cache address translation data structure in a volatile memory that directly translates a block logical address for targeted data to a candidate physical location on a cache device;
    storing a multilevel translation index in the volatile memory that is usable to translate the block logical address for the targeted data to an expected physical location on the cache device;
    determining if the targeted data resides at the candidate physical location retrieved from the direct cache address translation data structure; and
    in response to the targeted data not residing at the candidate physical location:
        accessing the targeted data at the expected physical location retrieved from the multilevel translation index; and
        caching the retrieved expected physical location in the direct cache address translation structure, including modifying the direct cache address translation data structure to:
            disassociate the candidate physical address from the block logical address for the targeted data; and
            associate retrieved expected physical location to the block logical address for the targeted data.

2. The method of claim 1, wherein the direct cache address translation data structure comprises a hash table, the method further comprising:
    determining a key based upon the block logical address;
    identifying a location of the candidate physical location in the hash table based on the key; and
    retrieving the candidate physical location from the identified location.

3. The method of claim 1, wherein;
    the direct cache address translation data structure stores a first identifier for the targeted data;
    a second identifier is stored at the candidate physical location; and
    the method further comprises comparing the first identifier to the second identifier to determine whether the data at the candidate physical location is the targeted data.

4. The method of claim 1, wherein in response to the block logical address for the targeted data not being associated with any candidate physical location in the direct cache address translation data structure:
    determining the expected physical location for the targeted data using the multilevel translation index; and
    modifying the direct cache address translation data structure to associate the determined expected physical address with the block logical address for the targeted data.

5. A system comprising:
    a persistent storage device;
    a low latency cache device;
    a volatile memory; and
    a processor to execute instructions stored on a machine-readable storage medium to:
        store a direct cache address translation data structure in the volatile memory that is usable to directly translate a block logical address for targeted data to a candidate physical location in the cache device, wherein the direct cache address translation data structure comprises a hash table;
        store a multilevel translation index in the volatile memory for translating the block logical address for the targeted data to an expected physical location of the targeted data in the cache device;
        apply a hash function to the block logical address to produce a hash value;
        retrieve the candidate physical location from the hash table based on the hash value;
        determine whether the targeted data resides at the candidate physical location retrieved from the direct cache address translation data structure;
        in response to the targeted data residing at the candidate physical location, access the targeted data at the candidate physical location; and
        in response to the targeted data not residing at the candidate physical address, access the targeted data at the expected physical location retrieved from the multilevel translation index.

6. The storage system of claim 5, wherein the low latency cache device comprises a second persistent storage device.

7. The storage system of claim 6, wherein the second persistent storage device comprises a storage class memory (SCM).

8. The storage system of claim 5, wherein the instructions to retrieve the candidate physical location from the hash table based on the hash value comprise instructions to:
utilize a first portion of the hash value as a first key for the hash table to identify a particular page of a plurality of pages; and
utilize the hash value as a second key for the hash table to identify a location of the candidate physical location on the particular page.

9. The storage system of claim 8, wherein each of the plurality of pages is protected by a spin lock.

10. The storage system of claim 5, wherein the hash table is N-way set associative, wherein N is no greater than 6.

11. The storage system of claim 5, wherein the hash table is set associative, wherein each set fits in two processor cache lines.

12. The storage system of claim 5, wherein the hash table is set associative and wherein each key has a location within its corresponding set based upon an eviction temperature for the key.

13. The storage system of claim 5, wherein:
the direct cache address translation data structure stores a first identifier for the targeted data;
a second identifier is stored at the candidate physical location; and
the instructions are executable to compare the first identifier to the second identifier to determine whether the data stored at the candidate physical location is the targeted data.

14. The storage system of claim 13, wherein the instructions are executable to, in response to the first identifier being different than the second identifier:
disassociate the candidate physical location from the block logical address for the targeted data in the direct cache address translation data structure;
determine the expected physical location for the targeted data using the multilevel translation index; and
associate the determined expected physical location to the block logical address for the targeted data.

15. The storage system of claim 5, wherein the instructions are executable to, in response to the block logical address for the targeted data not being associated with any candidate physical address:
determine the expected physical location for the targeted data using the multilevel translation index; and
modify the direct cache address translation data structure to associate the determined expected physical location with the block logical address for the targeted data.

16. The storage system of claim 5, wherein the multilevel translation index comprises:
a first level to translate the block logical address for the targeted data to an identifier for the targeted data; and
a second level to translate the identifier to the expected physical location of the targeted data.

17. The storage system of claim 5, wherein:
the multilevel translation index comprises:
a first index table to translate the block logical address to a first internal identifier; and
a second index table to translate the first internal identifier to the expected physical location on the cache device;
the instructions are executable to associate the first internal identifier with another physical location in response to data at the physical location being moved to the another physical location.

18. A non-transitory computer-readable medium comprising instructions executable by processor to:
store, in volatile memory, a direct cache address translation data structure that is usable to directly translate a block logical address for targeted data to a candidate physical location in a cache device;
store, in the volatile memory, a multilevel translation index usable to translate the block logical address for the targeted data to an expected physical location of the targeted data in the cache device, wherein the multilevel translation index comprises:
a first index table to translate the block logical address to a first internal identifier; and
a second index table to translate the first internal identifier to the expected physical location in the cache device;
determine whether the targeted data resides at the candidate physical location determined via the direct cache address translation data structure;
in response to the targeted data residing at the candidate physical location, access the targeted data at the candidate physical location;
in response to the targeted data not residing at the candidate physical location, access the targeted data at the expected physical location determined via the multilevel translation index; and
associate the first internal identifier with another physical location in response to data at the expected physical location being moved to the another physical location.

19. The non-transitory computer-readable medium of claim 18, wherein:
the direct cache address translation data structure comprises a hash table; and
the instructions are executable to:
apply a hash function to the block logical address to produce a hash value; and
retrieve the candidate physical location from the hash table based on the hash value.

20. The non-transitory computer-readable medium of claim 18, wherein the instructions are executable to:
in response to the targeted data not residing at the candidate physical location:
cache the retrieved expected physical location in the direct cache address translation structure, including modifying the direct cache address translation data structure to:
disassociate the candidate physical address from the block logical address for the targeted data; and
associate retrieved expected physical location to the block logical address for the targeted data.

* * * * *